US008078583B2

(12) United States Patent
Prahlad et al.

(10) Patent No.: US 8,078,583 B2
(45) Date of Patent: Dec. 13, 2011

(54) SYSTEMS AND METHODS FOR PERFORMING STORAGE OPERATIONS USING NETWORK ATTACHED STORAGE

(75) Inventors: Anand Prahlad, East Brunswick, NJ (US); Jeremy Schwartz, Red Bank, NJ (US)

(73) Assignee: Comm Vault Systems, Inc., Oceanport, NJ (US)

( * ) Notice: Subject to any disclaimer, the term of this patent is extended or adjusted under 35 U.S.C. 154(b) by 277 days.

(21) Appl. No.: 12/467,596

(22) Filed: May 18, 2009

(65) Prior Publication Data
US 2009/0248762 A1   Oct. 1, 2009

Related U.S. Application Data

(62) Division of application No. 10/990,360, filed on Nov. 15, 2004, now Pat. No. 7,546,324.

(60) Provisional application No. 60/519,949, filed on Nov. 13, 2003.

(51) Int. Cl.
*G06F 17/30* (2006.01)
*G06F 17/00* (2006.01)

(52) U.S. Cl. ........ 707/651; 707/640; 707/610; 711/201; 711/112; 711/154; 711/166

(58) Field of Classification Search .......... 707/651, 707/640, 644, 652, 653, 654, 661–666
See application file for complete search history.

(56) References Cited

U.S. PATENT DOCUMENTS

| 4,296,465 A | 10/1981 | Lemak |
| 4,686,620 A | 8/1987 | Ng |
| 4,751,639 A | 6/1988 | Corcoran et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,204,958 A | 4/1993 | Cheng et al. |

(Continued)

FOREIGN PATENT DOCUMENTS

EP   0 259 912   3/1988

(Continued)

OTHER PUBLICATIONS

Ashton, et al., "Two Decades of policy-based storage management for the IBM mainframe computer", www.research.ibm.com, 19 pages, published Apr. 10, 2003, printed Jan. 3, 2009—cited in U.S. Appl. No. 12/276,868., www.research.ibm.com, Apr. 10, 2003, pp. 19.
European Communication in Applicatoin No. 01906806.3, issued Sep. 21, 2010, in 6 pages.
http://en.wikipedia.org/wiki/Naive_Bayes_classifier.
International Search Report, PCT Application PCT/US02/17973, Aug. 22, 2002; 1 page.
Microsoft, about using Microsoft Excel 2000 files with earlier version Excel, 1985-1999, Microsoft, p. 1.

(Continued)

*Primary Examiner* — Yicun Wu
(74) *Attorney, Agent, or Firm* — Knobbe, Martens, Olson & Bear, LLP

(57) ABSTRACT

Systems and methods for performing hierarchical storage operations on electronic data in a computer network are provided. In one embodiment, the present invention may store electronic data from a network device to a network attached storage (NAS) device pursuant to certain storage criteria. The data stored on the NAS may be migrated to a secondary storage and a stub file having a pointer pointing to the secondary storage may be put at the location the data was previously stored on the NAS. The stub file may redirect the network device to the secondary storage if a read request for the data is received from the network device.

20 Claims, 6 Drawing Sheets

U.S. PATENT DOCUMENTS

| | | | |
|---|---|---|---|
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,265,159 A | 11/1993 | Kung |
| 5,276,860 A | 1/1994 | Fortier et al. |
| 5,276,867 A | 1/1994 | Kenley et al. |
| 5,287,500 A | 2/1994 | Stoppani, Jr. |
| 5,301,351 A | 4/1994 | Jippo |
| 5,311,509 A | 5/1994 | Heddes et al. |
| 5,321,816 A | 6/1994 | Rogan et al. |
| 5,333,251 A | 7/1994 | Urabe et al. |
| 5,333,315 A | 7/1994 | Saether et al. |
| 5,347,653 A | 9/1994 | Flynn et al. |
| 5,410,700 A | 4/1995 | Fecteau et al. |
| 5,426,284 A | 6/1995 | Doyle |
| 5,448,724 A | 9/1995 | Hayashi et al. |
| 5,455,926 A | 10/1995 | Keele et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,555,404 A | 9/1996 | Torbjornsen et al. |
| 5,559,957 A | 9/1996 | Balk |
| 5,559,991 A | 9/1996 | Kanfi |
| 5,574,898 A | 11/1996 | Leblang et al. |
| 5,598,546 A | 1/1997 | Blomgren |
| 5,613,134 A | 3/1997 | Lucus et al. |
| 5,615,392 A | 3/1997 | Harrison et al. |
| 5,619,644 A | 4/1997 | Crockett et al. |
| 5,638,509 A | 6/1997 | Dunphy et al. |
| 5,642,496 A | 6/1997 | Kanfi |
| 5,649,185 A | 7/1997 | Antognini et al. |
| 5,659,614 A | 8/1997 | Bailey |
| 5,673,381 A | 9/1997 | Huai et al. |
| 5,675,511 A | 10/1997 | Prasad et al. |
| 5,677,900 A | 10/1997 | Nishida et al. |
| 5,682,513 A | 10/1997 | Candelaria et al. |
| 5,687,343 A | 11/1997 | Fecteau et al. |
| 5,699,361 A | 12/1997 | Ding et al. |
| 5,719,786 A | 2/1998 | Nelson et al. |
| 5,729,743 A | 3/1998 | Squibb |
| 5,734,817 A | 3/1998 | Roffe et al. |
| 5,737,747 A | 4/1998 | Vishlitzky et al. |
| 5,740,405 A | 4/1998 | DeGraaf |
| 5,751,997 A | 5/1998 | Kullick et al. |
| 5,758,359 A | 5/1998 | Saxon |
| 5,758,649 A | 6/1998 | Iwashita et al. |
| 5,761,677 A | 6/1998 | Senator et al. |
| 5,761,734 A | 6/1998 | Pfeffer et al. |
| 5,764,972 A | 6/1998 | Crouse et al. |
| 5,778,395 A | 7/1998 | Whiting et al. |
| 5,790,828 A | 8/1998 | Jost |
| 5,805,920 A | 9/1998 | Sprenkle et al. |
| 5,806,058 A | 9/1998 | Mori et al. |
| 5,812,398 A | 9/1998 | Nielsen |
| 5,812,748 A | 9/1998 | Ohran et al. |
| 5,813,009 A | 9/1998 | Johnson et al. |
| 5,813,013 A | 9/1998 | Shakib et al. |
| 5,813,017 A | 9/1998 | Morris |
| 5,829,046 A | 10/1998 | Tzelnic et al. |
| 5,835,953 A | 11/1998 | Ohran |
| 5,845,257 A | 12/1998 | Fu et al. |
| 5,860,073 A | 1/1999 | Ferrel et al. |
| 5,860,104 A | 1/1999 | Witt et al. |
| 5,864,871 A | 1/1999 | Kitain et al. |
| 5,875,478 A | 2/1999 | Blumenau |
| 5,875,481 A | 2/1999 | Ashton et al. |
| 5,884,067 A | 3/1999 | Storm et al. |
| 5,887,134 A | 3/1999 | Ebrahim |
| 5,896,531 A | 4/1999 | Curtis et al. |
| 5,897,642 A | 4/1999 | Capossela et al. |
| 5,898,431 A | 4/1999 | Webster et al. |
| 5,901,327 A | 5/1999 | Ofek |
| 5,924,102 A | 7/1999 | Perks |
| 5,926,836 A | 7/1999 | Blumenau |
| 5,933,104 A | 8/1999 | Kimura |
| 5,933,601 A | 8/1999 | Fanshier et al. |
| 5,950,205 A | 9/1999 | Aviani, Jr. |
| 5,956,519 A | 9/1999 | Wise et al. |
| 5,956,733 A | 9/1999 | Nakano et al. |
| 5,958,005 A | 9/1999 | Thorne et al. |
| 5,970,233 A | 10/1999 | Lie et al. |
| 5,970,255 A | 10/1999 | Tran et al. |
| 5,974,563 A | 10/1999 | Beeler, Jr. |
| 5,978,841 A | 11/1999 | Berger |
| 5,987,478 A | 11/1999 | See et al. |
| 5,991,753 A | 11/1999 | Wilde |
| 5,995,091 A | 11/1999 | Near et al. |
| 6,000,020 A | 12/1999 | Chin et al. |
| 6,003,089 A | 12/1999 | Shaffer et al. |
| 6,009,274 A | 12/1999 | Fletcher et al. |
| 6,012,090 A | 1/2000 | Chung et al. |
| 6,016,553 A | 1/2000 | Schneider et al. |
| 6,018,744 A | 1/2000 | Mamiya et al. |
| 6,021,415 A | 2/2000 | Cannon et al. |
| 6,023,710 A | 2/2000 | Steiner et al. |
| 6,026,414 A | 2/2000 | Anglin |
| 6,026,437 A | 2/2000 | Muschett et al. |
| 6,052,735 A | 4/2000 | Ulrich et al. |
| 6,070,228 A | 5/2000 | Belknap et al. |
| 6,073,220 A | 6/2000 | Gunderson |
| 6,076,148 A | 6/2000 | Kedem et al. |
| 6,078,934 A | 6/2000 | Lahey et al. |
| 6,085,030 A | 7/2000 | Whitehead et al. |
| 6,088,694 A | 7/2000 | Burns et al. |
| 6,091,518 A | 7/2000 | Anabuki |
| 6,094,416 A | 7/2000 | Ying |
| 6,101,585 A | 8/2000 | Brown et al. |
| 6,105,037 A | 8/2000 | Kishi |
| 6,105,129 A | 8/2000 | Meier et al. |
| 6,108,640 A | 8/2000 | Slotznick |
| 6,108,712 A | 8/2000 | Hayes, Jr. |
| 6,112,239 A | 8/2000 | Kenner et al. |
| 6,122,668 A | 9/2000 | Teng et al. |
| 6,131,095 A | 10/2000 | Low et al. |
| 6,131,190 A | 10/2000 | Sidwell |
| 6,137,864 A | 10/2000 | Yaker |
| 6,148,377 A | 11/2000 | Carter et al. |
| 6,148,412 A | 11/2000 | Cannon et al. |
| 6,154,787 A | 11/2000 | Urevig et al. |
| 6,154,852 A | 11/2000 | Amundson et al. |
| 6,161,111 A | 12/2000 | Mutalik et al. |
| 6,161,192 A | 12/2000 | Lubbers et al. |
| 6,167,402 A | 12/2000 | Yeager |
| 6,175,829 B1 | 1/2001 | Li et al. |
| 6,189,051 B1 | 2/2001 | Oh et al. |
| 6,212,512 B1 | 4/2001 | Barney et al. |
| 6,212,521 B1 | 4/2001 | Minami et al. |
| 6,230,164 B1 | 5/2001 | Rikieta et al. |
| 6,249,795 B1 | 6/2001 | Douglis |
| 6,253,217 B1 | 6/2001 | Dourish et al. |
| 6,260,069 B1 | 7/2001 | Anglin |
| 6,269,382 B1 | 7/2001 | Cabrera et al. |
| 6,269,431 B1 | 7/2001 | Dunham |
| 6,275,953 B1 | 8/2001 | Vahalia et al. |
| 6,292,783 B1 | 9/2001 | Rohler |
| 6,295,541 B1 | 9/2001 | Bodnar |
| 6,301,592 B1 | 10/2001 | Aoyama et al. |
| 6,304,880 B1 | 10/2001 | Kishi |
| 6,314,439 B1 | 11/2001 | Bates et al. |
| 6,314,460 B1 | 11/2001 | Knight et al. |
| 6,324,581 B1 | 11/2001 | Xu et al. |
| 6,328,766 B1 | 12/2001 | Long |
| 6,330,570 B1 | 12/2001 | Crighton et al. |
| 6,330,572 B1 | 12/2001 | Sitka |
| 6,330,642 B1 | 12/2001 | Carteau |
| 6,343,287 B1 | 1/2002 | Kumar et al. |
| 6,343,324 B1 | 1/2002 | Hubis et al. |
| 6,350,199 B1 | 2/2002 | Williams et al. |
| RE37,601 E | 3/2002 | Eastridge et al. |
| 6,353,878 B1 | 3/2002 | Dunham |
| 6,356,801 B1 | 3/2002 | Goodman et al. |
| 6,360,306 B1 | 3/2002 | Bergsten |
| 6,367,029 B1 | 4/2002 | Mayhead et al. |

| | | |
|---|---|---|
| 6,374,336 B1 | 4/2002 | Peters et al. |
| 6,389,432 B1 | 5/2002 | Pothapragada et al. |
| 6,397,308 B1 | 5/2002 | Ofek et al. |
| 6,418,478 B1 | 7/2002 | Ignatius et al. |
| 6,421,711 B1 | 7/2002 | Blumenau et al. |
| 6,438,595 B1 | 8/2002 | Blumenau et al. |
| 6,453,325 B1 | 9/2002 | Cabrera et al. |
| 6,466,592 B1 | 10/2002 | Chapman |
| 6,470,332 B1 | 10/2002 | Weschler |
| 6,473,794 B1 | 10/2002 | Guheen et al. |
| 6,487,561 B1 | 11/2002 | Ofek et al. |
| 6,487,644 B1 | 11/2002 | Huebsch et al. |
| 6,493,811 B1 | 12/2002 | Blades et al. |
| 6,519,679 B2 | 2/2003 | Devireddy et al. |
| 6,538,669 B1 | 3/2003 | Lagueux, Jr. et al. |
| 6,542,909 B1 | 4/2003 | Tamer et al. |
| 6,542,972 B2 | 4/2003 | Ignatius et al. |
| 6,546,545 B1 | 4/2003 | Honarvar et al. |
| 6,549,918 B1 | 4/2003 | Probert et al. |
| 6,553,410 B2 | 4/2003 | Kikinis |
| 6,557,039 B1 | 4/2003 | Leong et al. |
| 6,564,219 B1 | 5/2003 | Lee et al. |
| 6,564,228 B1 | 5/2003 | O'Connor |
| 6,581,143 B2 | 6/2003 | Gagne et al. |
| 6,593,656 B2 | 7/2003 | Ahn et al. |
| 6,604,149 B1 | 8/2003 | Deo et al. |
| 6,631,493 B2 | 10/2003 | Ottesen et al. |
| 6,647,396 B2 | 11/2003 | Parnell et al. |
| 6,647,409 B1 | 11/2003 | Sherman et al. |
| 6,654,825 B2 | 11/2003 | Clapp et al. |
| 6,658,436 B2 | 12/2003 | Oshinsy et al. |
| 6,658,526 B2 | 12/2003 | Nguyen et al. |
| 6,704,933 B1 | 3/2004 | Tanaka et al. |
| 6,721,767 B2 | 4/2004 | De Meno et al. |
| 6,728,733 B2 | 4/2004 | Tokui |
| 6,732,124 B1 | 5/2004 | Koseki et al. |
| 6,742,092 B1 | 5/2004 | Huebsch et al. |
| 6,757,794 B2 | 6/2004 | Cabrera et al. |
| 6,760,723 B2 | 7/2004 | Oshinsky et al. |
| 6,763,351 B1 | 7/2004 | Subramaniam et al. |
| 6,789,161 B1 | 9/2004 | Blendermann et al. |
| 6,871,163 B2 | 3/2005 | Hiller et al. |
| 6,886,020 B1 | 4/2005 | Zahavi et al. |
| 6,952,758 B2 | 10/2005 | Chron et al. |
| 6,968,351 B2 | 11/2005 | Butterworth |
| 6,973,553 B1 | 12/2005 | Archibald, Jr. et al. |
| 6,978,265 B2 | 12/2005 | Schumacher |
| 6,983,351 B2 | 1/2006 | Gibble et al. |
| 7,003,519 B1 | 2/2006 | Biettron et al. |
| 7,003,641 B2 | 2/2006 | Prahlad et al. |
| 7,035,880 B1 | 4/2006 | Crescenti et al. |
| 7,039,860 B1 | 5/2006 | Gautestad |
| 7,062,761 B2 | 6/2006 | Slavin et al. |
| 7,076,685 B2 | 7/2006 | Pillai et al. |
| 7,082,441 B1 | 7/2006 | Zahavi et al. |
| 7,085,904 B2 | 8/2006 | Mizuno et al. |
| 7,096,315 B2 | 8/2006 | Takeda et al. |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,120,757 B2 | 10/2006 | Tsuge |
| 7,130,970 B2 | 10/2006 | Devassy et al. |
| 7,155,465 B2 | 12/2006 | Lee et al. |
| 7,155,481 B2 | 12/2006 | Prahlad et al. |
| 7,155,633 B2 | 12/2006 | Tuma et al. |
| 7,174,312 B2 | 2/2007 | Harper et al. |
| 7,194,454 B2 | 3/2007 | Hansen et al. |
| 7,246,140 B2 | 7/2007 | Therrien et al. |
| 7,246,207 B2 | 7/2007 | Kottomtharayil et al. |
| 7,269,612 B2 | 9/2007 | Devarakonda et al. |
| 7,272,606 B2 | 9/2007 | Borthakur et al. |
| 7,278,142 B2 | 10/2007 | Bandhole et al. |
| 7,287,047 B2 | 10/2007 | Kavuri |
| 7,293,133 B1 | 11/2007 | Colgrove et al. |
| 7,315,923 B2 | 1/2008 | Retnamma et al. |
| 7,315,924 B2 | 1/2008 | Prahlad et al. |
| 7,328,225 B1 * | 2/2008 | Beloussov et al. ............ 1/1 |
| 7,343,356 B2 | 3/2008 | Prahlad et al. |
| 7,343,365 B2 | 3/2008 | Farnham et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,356,657 B2 | 4/2008 | Mikami |
| 7,359,917 B2 | 4/2008 | Winter et al. |
| 7,380,072 B2 | 5/2008 | Kottomtharayil et al. |
| 7,389,311 B1 | 6/2008 | Crescenti et al. |
| 7,395,282 B1 | 7/2008 | Crescenti et al. |
| 7,409,509 B2 | 8/2008 | Devassy et al. |
| 7,430,587 B2 | 9/2008 | Malone et al. |
| 7,433,301 B2 | 10/2008 | Akahane et al. |
| 7,434,219 B2 | 10/2008 | De Meno et al. |
| 7,447,692 B2 | 11/2008 | Oshinsky et al. |
| 7,454,569 B2 | 11/2008 | Kavuri et al. |
| 7,467,167 B2 | 12/2008 | Patterson |
| 7,472,238 B1 | 12/2008 | Gokhale |
| 7,484,054 B2 | 1/2009 | Kottomtharayil et al. |
| 7,490,207 B2 | 2/2009 | Amarendran |
| 7,496,589 B1 | 2/2009 | Jain et al. |
| 7,500,053 B1 | 3/2009 | Kavuri et al. |
| 7,500,150 B2 | 3/2009 | Sharma et al. |
| 7,509,316 B2 | 3/2009 | Greenblatt et al. |
| 7,512,601 B2 | 3/2009 | Cucerzan et al. |
| 7,519,726 B2 | 4/2009 | Palliyll et al. |
| 7,529,748 B2 | 5/2009 | Wen et al. |
| 7,532,340 B2 | 5/2009 | Koppich et al. |
| 7,536,291 B1 | 5/2009 | Retnamma et al. |
| 7,543,125 B2 | 6/2009 | Gokhale |
| 7,546,324 B2 | 6/2009 | Prahlad et al. |
| 7,581,077 B2 | 8/2009 | Ignatius et al. |
| 7,596,586 B2 | 9/2009 | Gokhale et al. |
| 7,613,748 B2 | 11/2009 | Brockway et al. |
| 7,617,253 B2 | 11/2009 | Prahlad et al. |
| 7,617,262 B2 | 11/2009 | Prahlad et al. |
| 7,617,541 B2 | 11/2009 | Plotkin et al. |
| 7,627,598 B1 | 12/2009 | Burke |
| 7,627,617 B2 | 12/2009 | Kavuri et al. |
| 7,636,743 B2 | 12/2009 | Erofeev |
| 7,651,593 B2 | 1/2010 | Prahlad et al. |
| 7,661,028 B2 | 2/2010 | Erofeev |
| 7,668,798 B2 | 2/2010 | Scanlon et al. |
| 7,685,126 B2 | 3/2010 | Patel et al. |
| 7,716,171 B2 | 5/2010 | Kryger |
| 7,734,715 B2 | 6/2010 | Hyakutake et al. |
| 7,757,043 B2 | 7/2010 | Kavuri et al. |
| 7,840,537 B2 | 11/2010 | Gokhale et al. |
| 7,844,676 B2 | 11/2010 | Prahlad et al. |
| 7,873,808 B2 * | 1/2011 | Stewart ............ 711/201 |
| 7,877,351 B2 | 1/2011 | Crescenti et al. |
| 7,962,455 B2 | 6/2011 | Erofeev |
| 2002/0004883 A1 | 1/2002 | Nguyen et al. |
| 2002/0040376 A1 | 4/2002 | Yamanaka et al. |
| 2002/0042869 A1 | 4/2002 | Tate et al. |
| 2002/0049626 A1 | 4/2002 | Mathias et al. |
| 2002/0049778 A1 | 4/2002 | Bell et al. |
| 2002/0069324 A1 | 6/2002 | Gerasimov et al. |
| 2002/0103848 A1 | 8/2002 | Giacomini et al. |
| 2002/0107877 A1 | 8/2002 | Whiting et al. |
| 2002/0161753 A1 | 10/2002 | Inaba et al. |
| 2003/0061491 A1 | 3/2003 | Jaskiewicz et al. |
| 2003/0163399 A1 | 8/2003 | Harper et al. |
| 2003/0172158 A1 | 9/2003 | Pillai et al. |
| 2004/0010487 A1 | 1/2004 | Prahlad et al. |
| 2004/0107199 A1 | 6/2004 | Dairymple et al. |
| 2004/0193953 A1 | 9/2004 | Callahan et al. |
| 2004/0205206 A1 | 10/2004 | Naik et al. |
| 2004/0230829 A1 | 11/2004 | Dogan et al. |
| 2005/0033800 A1 | 2/2005 | Kavuri et al. |
| 2005/0044114 A1 | 2/2005 | Kottomtharayil et al. |
| 2005/0114406 A1 | 5/2005 | Borthakur et al. |
| 2005/0246510 A1 | 11/2005 | Retnamma et al. |
| 2006/0005048 A1 | 1/2006 | Osaki et al. |
| 2006/0010154 A1 | 1/2006 | Prahlad et al. |
| 2006/0010227 A1 | 1/2006 | Atluri |
| 2007/0043956 A1 | 2/2007 | El Far et al. |
| 2007/0078913 A1 | 4/2007 | Crescenti et al. |
| 2007/0100867 A1 | 5/2007 | Celik et al. |

| | | | |
|---|---|---|---|
| 2007/0143756 | A1 | 6/2007 | Gokhale |
| 2007/0183224 | A1 | 8/2007 | Erofeev |
| 2007/0288536 | A1 | 12/2007 | Sen et al. |
| 2008/0059515 | A1 | 3/2008 | Fulton |
| 2008/0229037 | A1 | 9/2008 | Bunte et al. |
| 2008/0243914 | A1 | 10/2008 | Prahlad et al. |
| 2008/0243957 | A1 | 10/2008 | Prahlad et al. |
| 2008/0243958 | A1 | 10/2008 | Prahlad et al. |
| 2008/0244177 | A1 | 10/2008 | Crescenti et al. |
| 2009/0055407 | A1 | 2/2009 | Oshinsky et al. |
| 2009/0271791 | A1 | 7/2009 | Gokhale |
| 2009/0228894 | A1 | 9/2009 | Gokhale |
| 2009/0248762 | A1 | 10/2009 | Prahlad et al. |
| 2009/0319534 | A1 | 12/2009 | Gokhale |
| 2009/0319585 | A1 | 12/2009 | Gokhale |
| 2010/0005259 | A1 | 1/2010 | Prahlad |
| 2010/0049753 | A1 | 2/2010 | Prahlad et al. |
| 2010/0094808 | A1 | 4/2010 | Erofeev |
| 2010/0100529 | A1 | 4/2010 | Erofeev |
| 2010/0122053 | A1 | 5/2010 | Prahlad et al. |
| 2010/0131461 | A1 | 5/2010 | Prahlad et al. |
| 2010/0138393 | A1 | 6/2010 | Crescenti et al. |
| 2010/0145909 | A1 | 6/2010 | Ngo |
| 2010/0179941 | A1 | 7/2010 | Agrawal et al. |
| 2010/0205150 | A1 | 8/2010 | Prahlad et al. |
| 2011/0066817 | A1 | 3/2011 | Kavuri et al. |
| 2011/0072097 | A1 | 3/2011 | Prahlad et al. |

FOREIGN PATENT DOCUMENTS

| | | |
|---|---|---|
| EP | 0259912 A | 3/1988 |
| EP | 0341230 | 11/1989 |
| EP | 0381651 | 8/1990 |
| EP | 0 405 926 | 1/1991 |
| EP | 0 467 546 | 1/1992 |
| EP | 0467546 A | 1/1992 |
| EP | 0 599 466 B1 | 6/1994 |
| EP | 0670543 | 9/1995 |
| EP | 0717346 | 6/1996 |
| EP | 0 774 715 | 5/1997 |
| EP | 0774715 A | 5/1997 |
| EP | 0 809 184 | 11/1997 |
| EP | 0 862 304 | 9/1998 |
| EP | 0 899 662 | 3/1999 |
| EP | 0 981 090 | 2/2000 |
| EP | 0981090 | 2/2000 |
| EP | 0 986 011 A2 | 3/2000 |
| EP | 1 174 795 | 1/2002 |
| JP | H11-102314 | 4/1999 |
| JP | H11-259459 | 9/1999 |
| JP | 2001-60175 | 3/2001 |
| WO | WO 94/17474 | 8/1994 |
| WO | WO 95/13580 | 5/1995 |
| WO | WO 98/39707 | 9/1998 |
| WO | WO 99/12098 | 3/1999 |
| WO | WO 99/14692 | 3/1999 |
| WO | WO 99/23585 | 5/1999 |
| WO | WO 01/04756 | 1/2001 |
| WO | WO 2005/050381 | 6/2005 |

OTHER PUBLICATIONS

Supplementary European Search Report, European Patent Application No. 02747883, Sep. 15, 2006; 2 pages.

Toyoda, Fundamentals of Oracle 8i Backup and Recovery, DB Magazine, Japan, Shoeisha, Co., Ltd.; Jul. 2000; vol. 10, No. 4, 34 total pages.

Armstead et al., "Implementation of a Campus-wide Distributed Mass Storage Service: The Dream vs. Reality," IEEE, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Arneson, David A., Control Data Corporation, Development of Omniserver; Mass Storage Systems:, 1990, pp. 88-93.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

International Preliminary Report on Patentability in PCT/US2004/038278 filed Nov. 15, 2004, (Publication No. WO2005/050381) dated May 15, 2006.

International Search Report in PCT/US2004/038278 filed Nov. 15, 2004, (Publication No. WO2005/050381) dated Feb. 1, 2006.

International Search Report on Patentability in PCT/US00/19364 filed Jul. 14, 2000 (Publication No. WO01/04756) dated Dec. 21, 2000.

Jander, M., "Launching Storage-Area Net," Data Communications, US, McGraw Hill, NY, vol. 27, No. 4 (Mar. 21, 1998), pp. 64-72.

Jason Gait, "The Optical File Cabinet: A Random-Access File System for Write-Once Optical Disks," IEEE Computer, vol. 21, No. 6, pp. 11-22 (1988) (see in particular figure 5 in p. 15 and recitation in claim 5).

Rosenblum et al., "The Design and Implementation of a Log-Structured File System," Operating Systems Review SIGOPS, vol. 25, No. 5, New York, US, pp. 1-15 (May 1991).

Weatherspoon H. et al., "Silverback: A Global-Scale Archival System," Mar. 2001, pp. 1-15.

Catapult, Inc., Microsoft Outlook 2000 Step by Step, Published May 7, 1999, "Collaborating with Others Using Outlook & Exchange", p. 8 including "Message Timeline."

Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

U.S. Appl. No. 13/011,219, filed Jan. 21, 2011, Crescenti, John et al.

European Office Action, Application No. EP 019068337, dated Mar. 26, 2008.

European Office Action, Application No. EP02778952.8, dated Apr. 22, 2008.

International Search Report and International Preliminary Report on Patentability, PCT/US2000/019363, dated May 4, 2001.

International Search Report and International Preliminary Report on Patentability, PCT/US2001/003183, dated Feb. 21, 2002.

International Search Report and International Preliminary Report on Patentability, PCT/US2001/003209, dated Sep. 29, 2001.

International Search Report and International Preliminary Report on Patentability, PCT/US2002/018169, dated Mar. 3, 2003.

International Search Report, PCT/US2000/019324, dated Dec. 21, 2000.

International Search Report, PCT/US2000/019329, dated Dec. 21, 2000.

International Search Report, PCT/US2001/003088, dated Dec. 23, 2003.

International Search Report, PCT/US2004/038278, dated Feb. 1, 2008.

Jander, "Launching Storage-Area Net," Data Communications, US, McGraw Hill, NY, vol. 27, No. 4(Mar. 21, 1998), pp. 64-72.

Japanese Office Action, Application No. 2003/502696, dated Jul. 15, 2008.

Rosenblum et al, "The Design and Implementation of a Log-Structure File System," Operating Systems Review SIGOPS, vol. 25, No. 5, New York, US, pp. 1-15 (May 1991).

Supplementary European Search Report, EP02778952.8, dated Sep. 21, 2006.

Translation of Japanese Office Action, Application No. 2003-504235, dated Mar. 25, 2008.

* cited by examiner

SYSTEMS AND METHODS FOR PERFORMING STORAGE OPERATIONS USING NETWORK ATTACHED STORAGE

CROSS-REFERENCE TO RELATED APPLICATIONS

This application claims priority to U.S. application Ser. No. 10/990,360, filed Nov. 15, 2004, entitled SYSTEMS AND METHODS FOR PERFORMING STORAGE OPERATIONS USING NETWORK ATTACHED STORAGE; and claims the benefit of U.S. Provisional Patent Application No. 60/519,949, filed Nov. 13, 2003, entitled PERFORMING STORAGE OPERATIONS USING NETWORK ATTACHED STORAGE, which are hereby incorporated by reference in their entirety.

COPYRIGHT NOTICE portion of the disclosure of this patent document contains material that is subject to copyright protection. The copyright owner has no objection to the facsimile reproduction by anyone of the patent document or the patent disclosures, as it appears in the Patent and Trademark Office patent files or records, but otherwise expressly reserves all other rights to copyright protection.

RELATED APPLICATIONS

This application is related to the following patents and pending applications, each of which is hereby incorporated herein by reference in its entirety: [0004] U.S. Pat. No. 6,418,478, titled PIPELINED HIGH SPEED DATA TRANSFER MECHANISM, issued Jul. 9, 2002; [0005] application Ser. No. 09/610,738, titled MODULAR BACKUP AND RETRIEVAL SYSTEM USED IN CONJUNCTION WITH A STORAGE AREA NETWORK, filed Jul. 6, 2000; [0006] U.S. Pat. No. 6,542,972, titled LOGICAL VIEW AND ACCESS TO PHYSICAL STORAGE IN MODULAR DATA AND STORAGE MANAGEMENT SYSTEM, issued Apr. 1, 2003; [0007] application Ser. No. 10/658,095, titled DYNAMIC STORAGE DEVICE POOLING IN A COMPUTER SYSTEM, filed Sep. 9, 2003; and [0008] application Ser. No. 10/818,749, titled SYSTEM AND METHOD FOR PERFORMING STORAGE OPERATIONS IN A COMPUTER NETWORK, filed Apr. 3, 2004.

BACKGROUND OF THE INVENTION

Field of the Invention

The present invention relates generally to performing storage operations on electronic data in a computer network, and more particularly, to data storage systems that employ primary and secondary storage devices wherein certain electronic data from the primary storage device is relocated to the secondary storage device pursuant to a storage policy and electronic data from the second storage device may retrieved directly or through the primary storage device.

The storage of electronic data has evolved over time. During the early development of the computer, storage of electronic data was limited to individual computers. Electronic data was stored in the Random Access Memory (RAM) or some other storage medium such as a magnetic tape or hard drive that was a part of the computer itself.

Later, with the advent of network computing, the storage of electronic data gradually migrated from the individual computer to stand-alone storage devices accessible via a network. These individual network storage devices soon evolved into networked tape drives, optical libraries, Redundant Arrays of Inexpensive Disks (RAID), CD-ROM jukeboxes, and other devices. Common architectures also include network attached storage devices (NAS devices) that are coupled to a particular network (or networks) that are used to provide dedicated storage for various storage operations that may be required by a particular network (e.g., backup operations, archiving, and other storage operations including the management and retrieval of such information).

A NAS device may include a specialized file server or network attached storage system that connects to the network. A NAS device often contains a reduced capacity or minimized operating and file management system (e.g., a microkernel) and normally processes only input/output (I/O) requests by supporting common file sharing protocols such as the Unix network file system (NFS), DOS/Windows, and server message block/common Internet file system (SMB/CIFS). Using traditional local area network protocols such as Ethernet and transmission control protocol/internet protocol (TCP/IP), a NAS device typically enables additional storage to be quickly added by connecting to a network hub or switch.

Hierarchical storage management (HSM) provides for the automatic movement of files from hard disk to slower, less-expensive storage media, or secondary storage. As shown in FIG. 1, the typical migration hierarchy is from magnetic disk 10 to optical disk 20 to tape 30. Conventional HSM software usually monitors hard disk capacity and moves data from one storage level to the next (e.g., from production level to primary storage and/or from primary storage to secondary storage, etc.) based on storage criteria associated with that data such as a storage policy, age, category or other criteria as specified by the network or system administrator. For example, an email system such as Microsoft Outlook™ may have attachments "aged off" (i.e., migrated once an age requirement is met) from production level storage to a network attached storage device By HSM systems. When data is moved off the hard disk, it is typically replaced with a smaller "placeholder" or "stub" file that indicates, among other things, where the original file is located on the secondary storage device.

A stub file may contain some basic information to identify the file itself and also include information indicating the location of the data on the secondary storage device. When the stub file is accessed with the intention of performing a certain storage operation, such as a read or write operation, the file system call (or a read/write request) is trapped by software and a data retrieval process (sometimes referred to as de-migration or restore) is completed prior to satisfying the request. De-migration is often accomplished by inserting specialized software into the I/O stack to intercept read/write requests. The data is usually copied back to the original primary storage location from secondary storage, and then the read/write request is processed as if the file had not been moved. The effect is that the user sees and manipulates the file as the user normally would, except experiencing a small latency initially when the de-migration occurs.

Currently, however, HSM is not commonly practiced in NAS devices. One reason for this is because it is very difficult, if not impossible, to intercept file system calls in NAS devices. Moreover, there are many different types of NAS devices, such as WAFL by Network Appliance of Sunnyvale, Calif., the EMC Celera file system by the EMC Corporation of Hopkinton, Mass., the Netware file system by Novell of Provo, Utah, and other vendors. Most of these systems export their file systems to host computers such as the common Internet file system (CIFS) or the network file system (NFS), but provide no mechanism to run software on their operating systems or reside on the file system stack to intercept read/write or other data requests. Further, many NAS devices are proprietary, which may require a significant reverse-engineering effort to determine how to insert software into the I/O stack to perform HSM operations, reducing portability of an HSM implementation.

Accordingly, what is needed are systems and methods that overcome these and other deficiencies.

SUMMARY OF THE INVENTION

The present invention provides, among other things, systems and methods for performing storage operations for electronic data in a computer network on a network attached storage device (NAS). Some of the steps involved in one aspect of the invention may include receiving electronic data from a network device for writing to the NAS device; writing the electronic data to the NAS device in a first location (i.e., primary storage); subsequently storing the electronic data to a second location (i.e., secondary storage); and storing a stub file at the first location, the stub file including a pointer to the second location that may redirect the network device to the second location if an access request for the electronic data is received from the network device. In some embodiments, when the NAS device receives an electronic data request from a network device, the operating system of the network device may recognize the stub file as a stub file. In this case, the network device may use the pointer to find the actual location of the stored electronic data, where the electronic data may be accessed and processed over the network by the network device itself.

In accordance with some aspects of the present invention, computerized methods are provided for archiving data that is written to a first location in a NAS device to a second location, and storing a stub file at the first location, the stub file having a pointer pointing to the second location, the stub file for redirecting a network device to the second location if a read request for the file is received from the network device.

The system may include a NAS device connected to a network. The network may interconnect several network devices, including, for example, several client computers, host computers, server computers, mainframe computers or mid-range computers, all sending file system requests to the NAS. The NAS device may receive the file request from the network devices and process them.

An example of a method for processing a request for storing data on the NAS device may include receiving the data from a network device for writing to the NAS device; writing the data to the NAS device in a first location known to the network device; storing the data to a second location; and storing a stub file at the first location, the stub file having a pointer pointing to the second location, the stub file for redirecting the network device to the second location if a read request for the data is received from the network device. In some embodiments, the stub file may be named the same as the data that was stored in the first location before archiving. However, when the network attached storage device provides a read request to read the data, the operating system of the network device may recognize the stub file as a stub file. The network device may then perform the task of following the pointer to the actual location of the archived data, where the data may be read from and processed over the network by the network device itself. This relieves the NAS device from excess processing of the read request, including having to de-migrate the data from secondary storage.

Thus, one way to process a read request in accordance with an embodiment of the present invention includes opening the stub file stored in place of the data by the NAS device at a first location, the first location being where the data was stored before the file was archived to a second location by the network attached storage system; reading a pointer stored in the stub file, the pointer pointing to the second location; and reading the data from the second storage location.

BRIEF DESCRIPTION OF THE DRAWINGS

The invention is illustrated in the figures of the accompanying drawings which are meant to be exemplary and not limiting, in which like references are intended to refer to like or corresponding parts throughout, and in which.

DETAILED DESCRIPTION OF THE PREFERRED EMBODIMENTS

Figure 1:
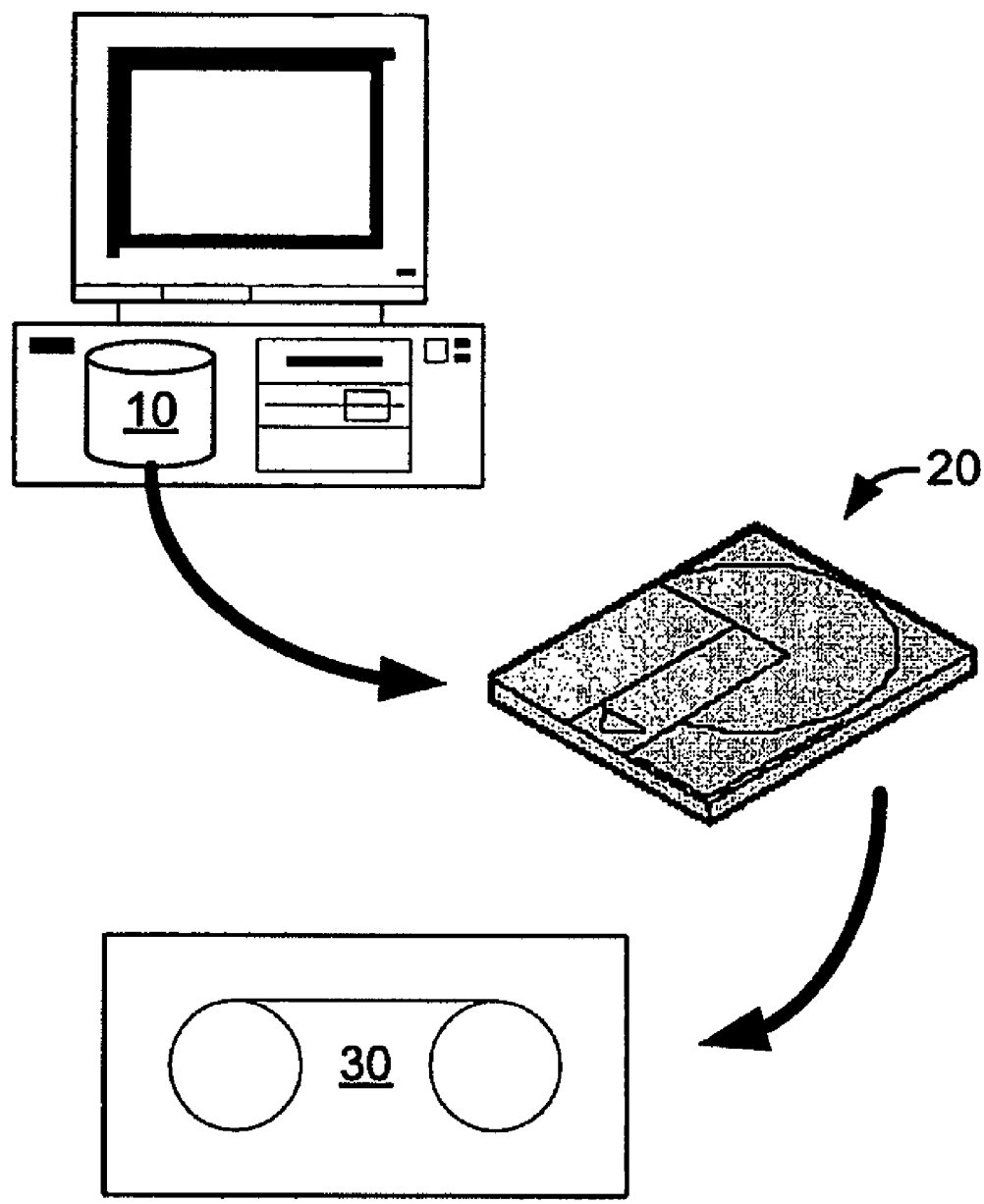
FIG. 1 is a diagrammatic representation of basic components and data flow of prior art HSM systems.
Figure 2:
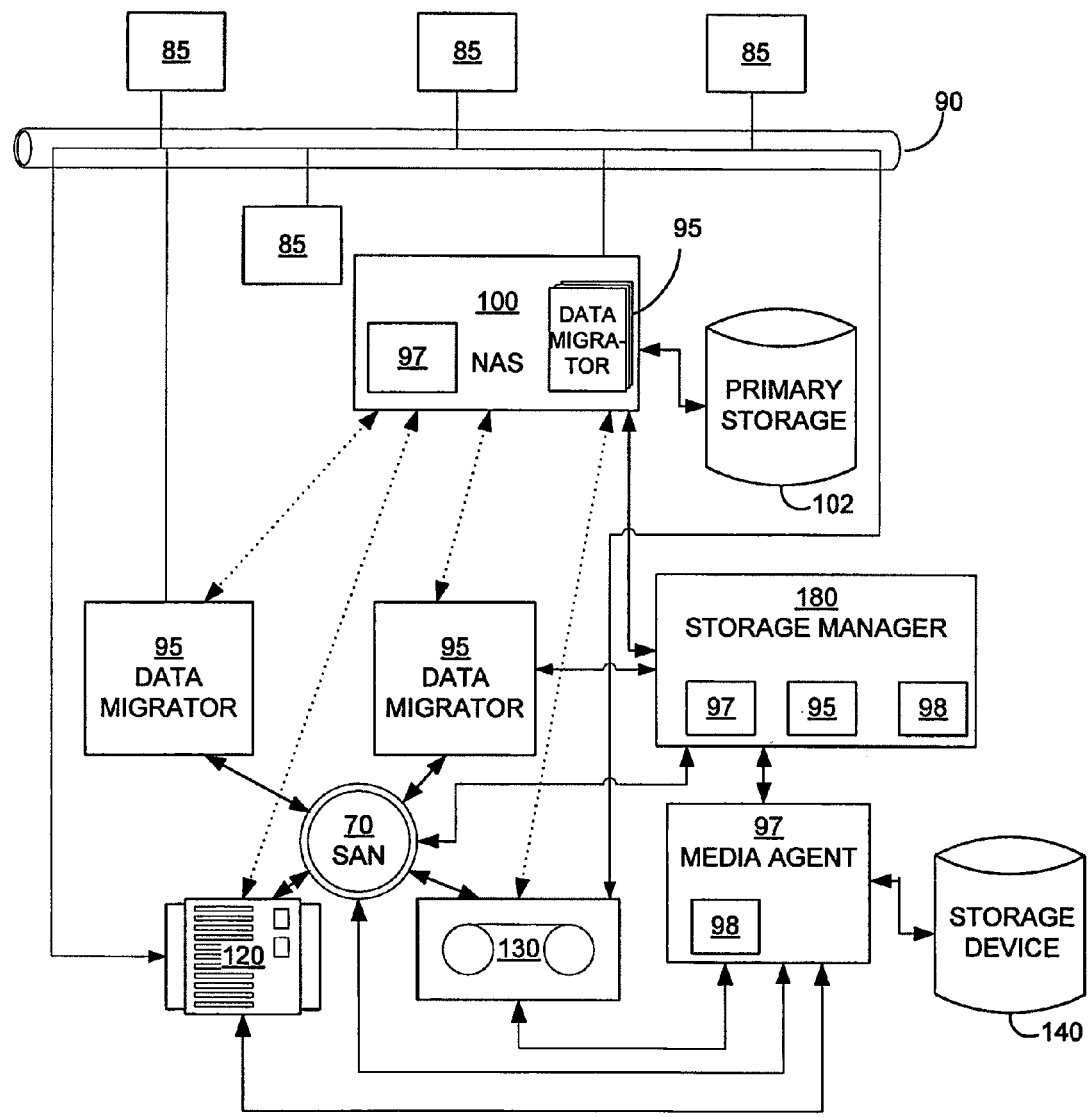
FIG. 2 is a block diagram of a system constructed in accordance with the principles of the present invention for storing and retrieving electronic data from primary and secondary storage locations.

An embodiment of a system 50 constructed in accordance with the principles of the present invention is shown in FIG. 2. As shown, system 50 may include a NAS device 100, a network 90, network devices 85, data migrators 95, primary storage device 102, secondary storage devices 120 and 130, storage area network (SAN) 70, media agent 97, storage device 140 and storage manager 180. NAS 100 may be coupled to network 90 which may itself also include or be part of several other network types, including, without limitation, Ethernet, IP, Infineon, Wi-Fi, wireless, Bluetooth or token-ring, and other types.

One or more network devices 85 may be coupled to network 90. Each network device 85 may include a client application, a client computer, a host computer, a mainframe computer, a mid-range computer, or any other type of device capable of being connected in a network and running applications which produce electronic data that is periodically stored. Such data may be sometimes referred to as "production level" data. In some embodiments, a network device 85 may have the ability to generate electronic data requests, such as file requests and system requests to NAS device 100 through the network 90.

NAS device 100 may include, and/or be connected to, a primary storage device 102 such as a hard disk or other memory that provides relatively high-speed data access (as compared to secondary storage systems). Primary storage device 102 may include additional storage for NAS device 100 (which may itself include some internal storage), and may be the first network storage device accessed by network devices 85.

As shown in FIG. 2, NAS device 100 may include one or more data migrators 95, each of which may be implemented as a software program operating on NAS 100, as an external computer connected to NAS 100, or any combination of the two implementations. Data migrator 95 may be responsible for storing electronic data generated by a network device 85 in primary storage device 102, or other memory location in NAS device 100, based on a set of storage criteria specified by a system user (e.g., storage policy, file size, age, type, etc.). Moreover, data migrators 95 may form a list or otherwise keep track of all qualifying data within network devices 85 and copy that data to primary storage device 102 as necessary (e.g., in a backup or archiving procedure, discussed in more detail below).

A storage policy (or criteria) is generally a data structure or other information that includes a set of preferences and other storage criteria for performing a storage operation. The preferences and storage criteria may include, but are not limited to: a storage location, relationships between system components, network pathway(s) to utilize, retention policies, data characteristics, compression or encryption requirements, preferred system components to utilize in a storage operation, and other criteria relating to a storage operation. A storage policy may be stored to a storage manager index, to archive media as metadata for use in restore operations or other storage operations, or to other locations or components of the system.

Storage operations, which may generally include data migration and archiving operations may involve some or all of the following operations, but are not limited thereto, including creation, storage, retrieval, migration, deletion, and tracking of primary or production volume data, secondary volume data, primary copies, secondary copies, auxiliary copies, snapshot copies, backup copies, incremental copies, differential copies, synthetic copies, HSM copies, archive copies, Information Lifecycle Management ("ILM") copies, and other types of copies and versions of electronic data.

De-migration as used herein generally refers to data retrieval-type operations and may occur when electronic data that has been previously transferred from a first location to a second location is transferred back or otherwise restored to the first location. For example, data stored on NAS 100 and migrated to in secondary storage and then returned to NAS 100 may be considered de-migrated. De-migration may also occur in other contexts, for example, when data is migrated from one tier of storage to another tier of storage (e.g., from RAID storage to tape storage) based on aging policies in an ILM context, etc. Thus, if it was desired to access data that had been migrated to a tape, that data could be de-migrated from the tape back to RAID, etc.

In some embodiments, data migrators 95 may also monitor or otherwise keep track of electronic data stored in primary storage 102 for possible archiving in secondary storage devices 120 and 130. In such embodiments, some or all data migrators 95 may periodically scan primary storage device 102 searching for data that meet a set storage or archiving criteria. If certain data on device 102 satisfies a set of established archiving criteria, data migrator 95 may "discover" certain information regarding that data and then migrate it (i.e., coordinate the transfer the data or compressed versions of the data) to secondary storage devices, which may include tape libraries, magnetic media, optical media, or other storage devices. Moreover, is some embodiments archiving criteria, which generally may be a subset set of storage criteria (or policies), may specify criteria for archiving data or for moving data from primary to secondary storage devices.

As shown in FIG. 2, one or more secondary storage devices 120 and 130 may be coupled to NAS device 100 and/or to one or more stand alone or external versions of data migrators 95. Each secondary storage device 120 and 130 may include some type of mass storage device that is typically used for archiving or storing large volumes of data. Whether a file is stored to secondary storage device 120 or device 130 may depend on several different factors, for example, on the set of storage criteria, the size of the data, the space available on each storage device, etc.

In some embodiments, data migrators 95 may generally communicate with the secondary storage devices 120 and 130 via a local bus such as a SCSI adaptor or an HBA (host bus adaptor). In some embodiments, secondary storage devices 120 and 130 may be communicatively coupled to the NAS device 100 or data migrators 95 via a storage area network (SAN) 70.

Certain hardware and software elements of system 50 may be the same as those described in the three-tier backup system commercially available as the CommVault QiNetx backup system from CommVault Systems, Inc. of Oceanport, N.J., and further described in application Ser. No. 09/610,738 which is incorporated herein by reference in its entirety.

In some embodiments, rather than using a dedicated SAN 70 to connect NAS 100 to secondary storage devices 120 and 130, the secondary storage devices may be directly connected to the network 90. In this case, the data migrators 95 may store or archive the files over the network 90 directly to the secondary storage devices 120 and 130. In the case where standalone versions of the data migrators 95 are used without a dedicated SAN 70, data migrators 95 may be connected to the network 90, with each stand-alone data migrator 95 performing its tasks on the NAS device 100 over the network.

In some embodiments, system 50 may include a storage manager 180 and one or more of the following: a media agent 98, an index cache 97, and another information storage device 140 that may be a redundant array of independent disks (RAID) or other storage system. These elements are exemplary of a three-tier backup system such as the CommVault QiNetx backup system, available from CommVault Systems, Inc. of Oceanport, N.J., and further described in application Ser. No. 09/610,738 which is incorporated herein by reference in its entirety.

Storage manager 180 may generally be a software module or application that coordinates and controls system 50. Storage manager 180 may communicate with some or all elements of system 50 including client network devices 85, media agents 97, and storage devices 120, 130 and 140, to initiate and manage system storage operations, backups, migrations, and recoveries.

A media agent 97 may generally be a software module that conveys data, as directed by the storage manager 180, between network device 85, data migrator 95, and one or more of the secondary storage devices 120, 130 and 140 as necessary. Media agent 97 is coupled to and may control the secondary storage devices 120, 130 and 140 and may communicate with the storage devices 120, 130 and 140 either via a local bus such as a SCSI adaptor, an HBA or SAN 70.

Each media agent 97 may maintain an index cache 98 that stores index data system 50 generates during, store backup, migration, archive and restore operations. For example, storage operations for Microsoft Exchange data may generate index data. Such index data may provide system 50 with an efficient mechanism for locating stored data for recovery or restore operations. This index data is generally stored with the data backed up on storage devices 120, 130 and 140 as a header file or other local indicia and media agent 97 (that typically controls a storage operation) may also write an additional copy of the index data to its index cache 98. The data in the media agent index cache 98 is thus generally readily available to system 50 for use in storage operations and other activities without having to be first retrieved from a storage device 120, 130 or 140.

Storage manager 180 may also maintain an index cache 98. The index data may be used to indicate logical associations between components of the system, user preferences, management tasks, and other useful data. For example, the storage manager 180 may use its index cache 98 to track logical associations between several media agents 97 and storage devices 120, 130 and 140.

Index caches 98 may reside on their corresponding storage component's hard disk or other fixed storage device. In one embodiment, system 50 may manage index cache 98 on a least recently used ("LRU") basis as known in the art. When the capacity of the index cache 98 is reached, system 50 may overwrite those files in the index cache 98 that have been least recently accessed with new index data. In some embodiments, before data in the index cache 98 is overwritten, the data may be copied t a storage device 120, 130 or 140 as a "cache copy." If a recovery operation requires data that is no longer stored in the index cache 98, such as in the case of a cache miss, system 50 may recover the index data from the index cache copy stored in the storage device 120, 130 or 140.

In some embodiments, other components of system 50 may reside and execute on the storage manager 180. For example, one or more data migrators 95 may execute on the storage manager 180.

Figure 3:
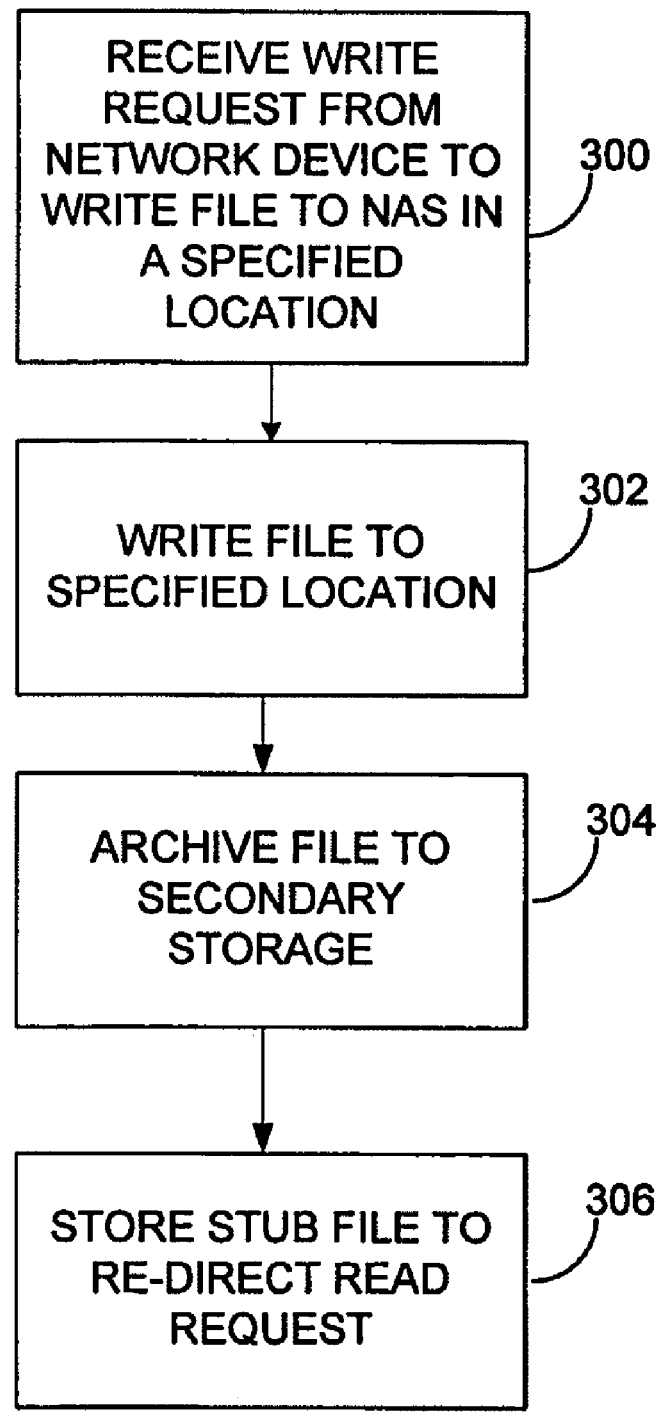
FIG. 3 is a flow chart illustrating some of the steps for performing storage and retrieval operations on electronic data in a computer network according to an embodiment of the invention.

Referring now to FIG. 3, some of the steps involved in practicing an embodiment of the present invention are shown in the flow chart illustrated thereon. When a network device sends a write request for writing a data to the NAS device, the write request may include a folder, directory or other location in which to store the data on the NAS device (step 300). Through a network, the network device may write the data to the NAS device, storing the file in primary storage (and/or NAS) in the location specified in the write request (step 302). As shown, after a data migrator copies data to secondary storage (step 304) the data migrator may store a stub file at the original file location, the stub file having a pointer pointing to the location in secondary storage where the actual file was stored, and to which the network device can be redirected if a read request for the file is received from the network device, step 306.

Figure 4:
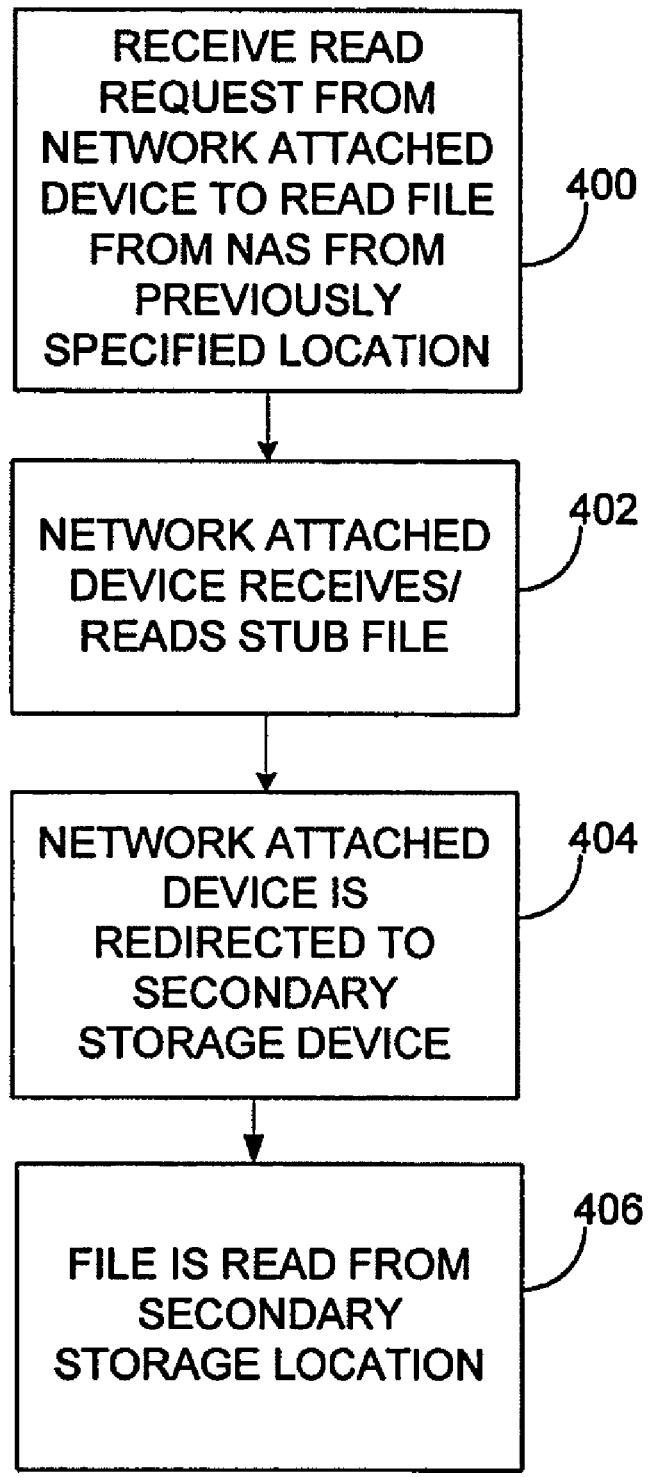
FIG. 4 is a flow chart illustrating some of the steps performed when a system application attempts to access electronic data moved from primary storage to secondary storage in accordance with an embodiment of the present invention.

Referring now to FIG. 4, some of the steps involved in attempting to read certain data that has been migrated to secondary storage media is shown in the flow chart of FIG. 4. As illustrated, a network device may attempt to read data that was originally stored at the current location of the stub file at step 400. The operating system of the network device may read the stub file at step 402 and recognize that the data is now a stub file, and be automatically redirected to read the data from the location pointed to by the stub file at step 404. This may be accomplished for example, by having the network device follow a Windows shortcut or a UNIX softlink (in Solaris applications). The data may then be accessed by directly reading from the secondary storage location at step 406. Although this process may cause a slight delay or latency attributable to the redirection, and, in the case of a secondary storage device using cassettes or other library media, may cause additional delay involved with finding the proper media, the delay normally associated with de-migrating the data to primary storage is eliminated.

Figure 5:
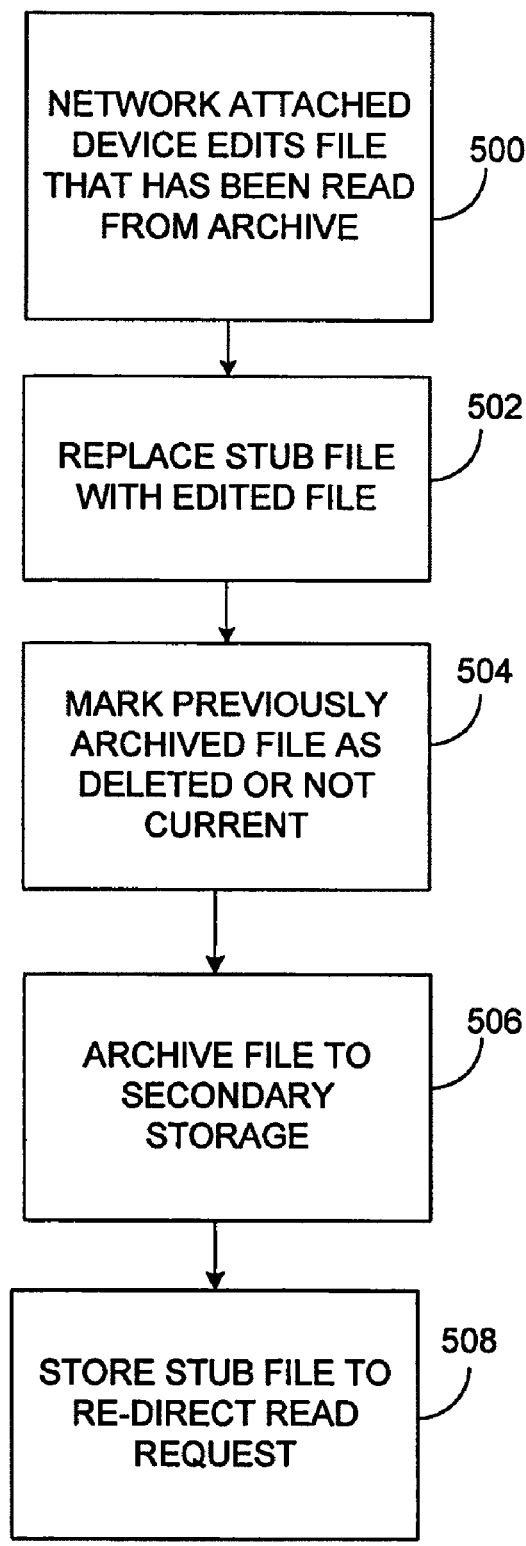
FIG. 5 is a flow chart illustrating some of the steps performed when a system application attempts to alter electronic data moved from primary storage to secondary storage in accordance with an embodiment of the present invention.

With reference to FIG. 5, a flow chart illustrating some of the steps performed when data is edited after being read from archive by a client network device are shown. After the data is read from a secondary storage device and edited (step 500), if the network device performs a save operation and issues a write request to the NAS device (and generally speaking, not a save-as operation to store the file in a new location), the data may be stored in the primary storage device at the original location where the data was stored before archiving, replacing the stub file (step 502). Depending on the type of file system and configuration of the secondary storage device, the archived data may be marked as deleted or outdated if the secondary storage device retains old copies of files as a backup mechanism (step 504). Next, the edited data continues to reside in primary storage until a data migrator archives the edited data to secondary storage (step 506) and places a stub file in its place in primary storage (step 508).

In other embodiments, when a network device issues a save command after the data edited in step 500, instead of being stored to the stub file location, the data may be stored back to the archive location, leaving the stub file intact, except that if the stub file may keep track of data information, such information may be changed according to the edited data.

In an embodiment that stores files that can be read by a network device using the Windows operating system, for example, the data migrator may produce a Windows shortcut file of the same name as the archived file. Other operating systems may provide for use of shortcut files similar to Windows shortcuts that can be used as stub files in the present system, including, for example, Mac OS by Apple Computer, Inc. of Cupertino, Calif.

Also, in embodiments which store files that can be read by a network device using Unix type file systems, such as Linux, Solaris, or the like, a softlink is used for re-direction, which is similar to a Windows shortcut. For example, a typical command to create a softlink in Unix systems is as follows: [0054] In -s/primary_storage_location/stubfile/secondary_storage_location/archivefile wherein primary_storage_location is the location in the primary storage device, the stubfile is the name of the stub file containing the softlink, the secondary_storage_location is the location to which the file is archived, and the archivefile is the name of the file stored in the secondary location.

In some Unix-based systems, such as Solaris, when a network device needs to read a file, the network directory and drive where the file resides may need to be mounted if the directory and file are not already mounted. When the network device issues a read request to a NAS device to read an archived file in such a system, the Softlink stored in the data's primary storage location may have been archived to a drive or directory that is not already mounted for file access.

One way to resolve this issue of unmounted drives or directories is to trap the read request, either by the NAS device or the network device, to interrupt processing and to mount the drive and/or directory to which the Softlink is pointing to the archived data so the network device may then read the data from the secondary location.

However, many Unix file systems do not provide a ready infrastructure to trap an input/output request before the request is usually propagated to the file system. Using Solaris as an example, many Unix systems typically provide a generic file system interface called a virtual file system (vfs). Vfs supports use by various file systems such as the Unix file system (ufs), Unix network file system (nfs), the Veritas file system (vxfs), etc. Similarly, directories in these file systems may need to be mounted on the individual network devices in Unix based systems. Vfs can act as a bridge to communicate with different file systems using a stackable file system.

Figure 6:
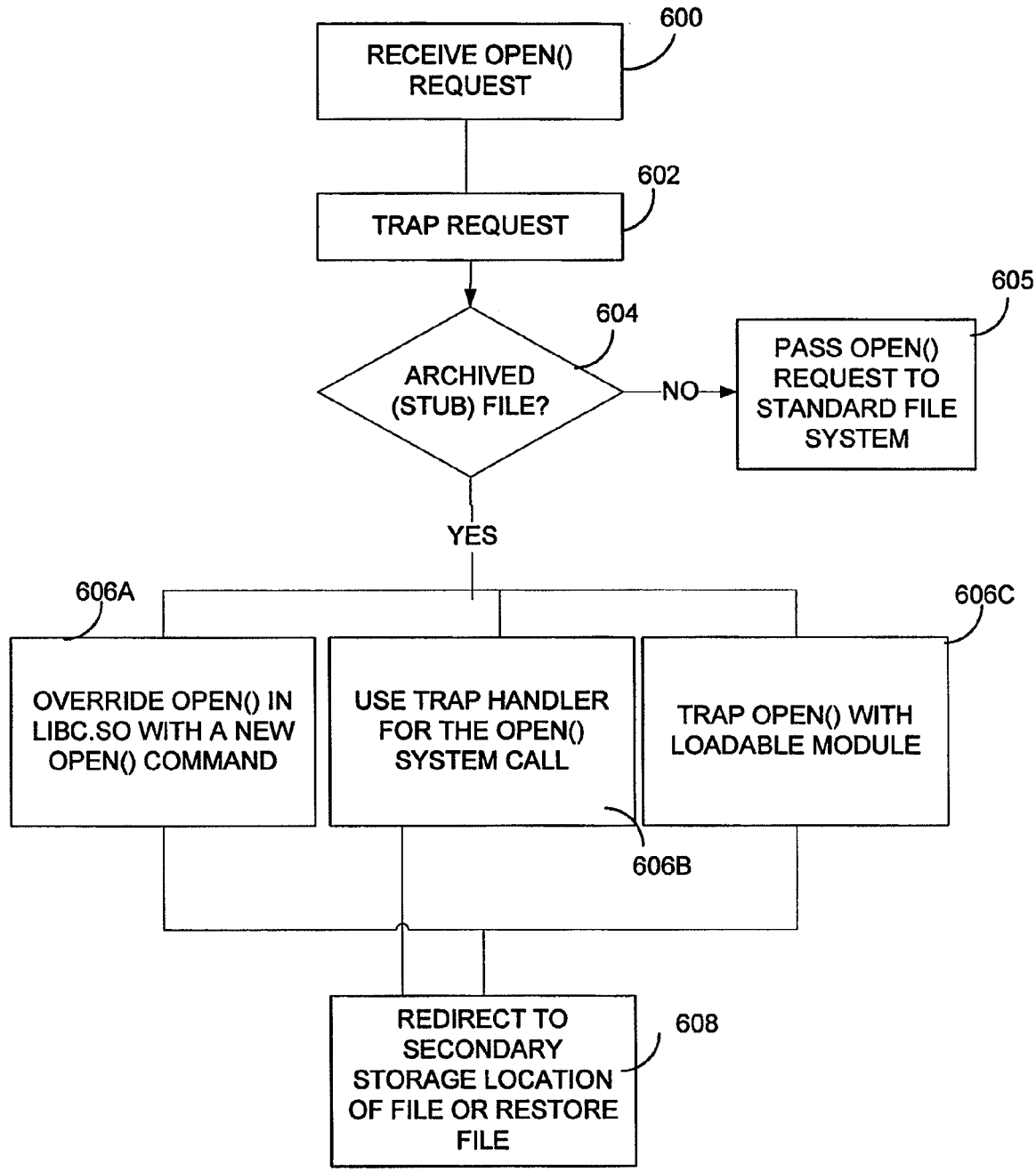
FIG. 6 is a chart illustrating steps performed in a Solaris-based embodiment of the system shown in FIG. 2.

FIG. 6 is a flow chart illustrating some of the steps performed in a Solaris-based embodiment of the present invention, which provides one or more data migrators that each which may include a stackable loopback file system. The stackable loopback file system's interface may be designed such that if a network device or an application issues a read/write request (i.e., an open( ) request), the stackable loopback file system intercepts the request (step 600). The stackable loopback file system may provide a facility to trap calls, such as open, read, write and other typical Unix file operations if the request is for a stub file (step 602). If the request is for a non-archived file, (step 604) then the stackable loopback file system propagates the normal operations to the underlying file system such as ufs and vxfs, step 605, and a regular open( ) is performed by the underlying file system.

Otherwise, if the request is for an archived file, FIG. 6 presents some options of three different embodiments to perform the handling of the trapped request, steps 606A, 606B or 606C, after which, the system may redirect the application or restores the file stored at the secondary location to the stub file location, step 608. Option one, step 606A, is to override the open( ) operation in the libc.so library with a new open( ) command (i.e. cv_open). This may be used for applications that use libc.so during runtime. For the applications which are using dynamically linkable libraries, if the open( ) operation can be overwritten in libc.so with cv_open keeping intact the existing symbols for the other calls, then this option will work for those applications as well. However, this option may not work for applications which directly open the file in the kernel, such as database applications. Further, this option may not work for the statically linked applications.

Option two, step 606B, involves changing the trap handler for the open( ) system call. Trap handlers are implemented in assembly and are typically specific to the various Unix architectures. Solaris systems usually include a generic trap handler for system calls and other traps and may be implemented, if desired.

Option three, step 606C, may be used for implementing a stackable loopback file system. This option uses a loopback file system that propagates the normal operations to the underlying file System like ufs, vxfs and also provides a facility to trap the required calls. The stackable loopback file system provides the various vfs operations. The stackable loopback file system also provides vnode operations typically used by other file systems. A vnode may be a virtual node comprising a data structure used within Unix-based operating systems to represent an open file, directory, device, or other entity (e.g., socket) that can appear in the file system namespace. The stackable loopback file system provides a mount option to mount the existing file directory to some other location that is used as the secondary location for storing the file. The special mount operation may search through the underlying file system, store the necessary information of the underlying file system, and assign the path as its starting root. Example commands to accomplish this operation follows:

mount_cxfs/etc/etc mount_cxfs/etc/tmp/etc_temp

Where /etc/tmp/etc_temp does not appear in a mounted path already. This mount option is used for those file directories, which are not already mounted.

One way to implement the additional functionality of stackable loopback file system is to make the stackable loopback file system a loadable module or driver. Unix systems, such as Solaris, usually support file system drivers such as the loadable modules. The stackable loopback file system module may support both normal file system and driver functionalities. The stackable loopback file system driver may use input-output controls (ioctls), which are special request device drivers above and beyond calls to the read or write entry points, to provide the capability to mount the file directories. Vnode operations may simply pass through the driver to the underlying file system, except that read/write/mmap operations are trapped to handle data migration of the relocated files, and performs a lookup operation to resolve recursions of the files mounted to some other location.

The driver may be included in the migrator, preferably in an embodiment where the migrator resides on the NAS. The migrator may include a relocate daemon that triggers the data migration for the files to be migrated if user defined policies are met. The relocate daemon may then creates the stub file. A redirect/restore daemon may be triggered by the stackable loopback file system when a stub file is accessed. The restore daemon may mount the drive and/or secondary drive or directory where the file was archived if the drive and directory are not already mounted. The stackable loopback file system may then re-directs the network device to the directory where the file is stored as described above. In an alternative embodiment, after mounting the drive and directory, the file may be restored to the primary location. The driver may generate an event for the restore daemon to complete restoration. Restore daemon may send an ioctl for the completion of the restoration and deletes the stub file.

Thus, as can be seen from the above, systems and methods for recovering electronic information from a storage medium are provided. It will be understood that the foregoing is merely illustrative of the principles of the present invention and that various modifications can be made by those skilled in the art without departing from the scope and spirit of the invention. Accordingly, such embodiments will be recognized as within the scope of the present invention.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

Persons skilled in the art will appreciate that the present invention can be practiced by other than the described embodiments, which are presented for purposes of illustration rather than of limitation and that the present invention is limited only by the claims that follow.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. In a computer system, a method for accessing electronic data, the method comprising:
    intercepting a read request for electronic data in a computer system with a file system, wherein the read request is for the electronic data stored in a first storage location associated with a first directory of a first directory path in a network attached storage device, wherein the electronic data has been moved to a second storage location associated with a second directory in a different storage device, and wherein the second storage location is identified with a stub file;
    determining the second storage location of the electronic data by reading information contained in the stub file with one or more computer processors;
    invoking a restore operation with one or more computer processors to determine the second directory in which the electronic data is stored in the second storage location; and
    mounting the second directory in the file system by associating the second directory with at least a portion of the first directory path;
    retrieving, in response to the read request, the electronic data from the second storage location via the mounted second directory without transferring the electronic data to the first storage location associated with the first directory in the network attached storage device.

2. The method of claim 1 further comprising editing the electronic data retrieved from the second storage location without transferring the electronic data to the first storage location in the network attached storage device.

3. The method of claim 2 further comprising storing the edited electronic data in the first storage location in the network attached storage device.

4. The method of claim 2 wherein the stub file is updated to reflect edits made to the electronic data without transferring the electronic data to the first storage location.

5. The method of claim 1 further comprising decompressing or otherwise decoding the retrieved data from the second storage location.

6. The method of claim 5 wherein decompressing the electronic data creates substantially the same format the electronic data was in prior to storage in the second storage location.

7. The method of claim 1 further comprising replacing the stub file with the electronic data retrieved from the second storage location.

8. The method of claim 1 wherein the stub file includes a UNIX softlink.

9. The method of claim 1 wherein the stub file includes a pointer to the second storage location.

10. The method of claim 1, wherein retrieving the electronic data from the second storage location further comprises determining if the second storage location is mounted and, if not mounted, mounting the second storage location.

11. A method for accessing electronic data, the method comprising:
    intercepting a read request for electronic data in a computer system, wherein the read request is for the electronic data stored in a first storage location associated with a first directory of a first directory path in a network attached storage device, wherein the electronic data has been moved to a second storage location associated with a second directory in a different storage device, and wherein the second storage location is identified with a stub file;
    determining the second storage location of the electronic data by reading information contained in the stub file with one or more computer processors; and
    mounting the second directory in the file system by associating the second directory with at least a portion of the first directory path;
    retrieving, in response to the read request, the electronic data from the second storage location via the mounted second directory without transferring the electronic data to the first storage location associated with the first directory in the network attached storage device.

12. The method of claim 11 further comprising editing the electronic data retrieved from the second storage location without transferring the electronic data to the first storage location in the network attached storage device.

13. The method of claim 12 further comprising storing the edited electronic data in the first storage location in the network attached storage device.

14. The method of claim 12 wherein the stub file is updated to reflect edits made to the electronic data in the second storage location without transferring edits made to the electronic data to the first storage location.

15. The method of claim 11 further comprising decompressing data retrieved from the second storage location.

16. The method of claim 15 wherein decompressing the electronic data creates substantially the same format the electronic data was in prior to storage in the second storage location.

17. The method of claim 11 further comprising replacing the stub file with the electronic data retrieved from the second storage location.

18. The method of claim 11 wherein the stub file includes a UNIX softlink.

19. The method of claim 11 wherein the stub file includes a pointer to the second storage location.

20. The method of claim 11, wherein retrieving the electronic data from the second storage location further comprises determining if the second storage location is mounted and, if not mounted, mounting the second storage location.

* * * * *